United States Patent [19]

Venuso

[11] 4,413,419
[45] Nov. 8, 1983

[54] METHOD AND APPARATUS FOR REMOTE MEASURING

[75] Inventor: Nicholas A. Venuso, Hickory Hills, Ill.

[73] Assignee: Metropolitan Sanitary District of Greater Chicago, Chicago, Ill.

[21] Appl. No.: 377,503

[22] Filed: May 12, 1982

Related U.S. Application Data

[62] Division of Ser. No. 166,372, Jul. 7, 1980, Pat. No. 4,367,652.

[51] Int. Cl.³ ............................................. G01B 5/20
[52] U.S. Cl. ............................. 33/174 G; 33/174 E; 33/175; 33/459
[58] Field of Search ............... 33/174 E, 174 R, 175, 33/456, 459–463, 455

[56] References Cited

U.S. PATENT DOCUMENTS

| 79,032 | 6/1868 | Tierney | 33/456 |
| 94,968 | 9/1869 | Moore | 33/456 |
| 777,606 | 12/1904 | Knowlton | 33/456 |
| 3,995,373 | 12/1976 | Brumbelow | 33/143 M |

FOREIGN PATENT DOCUMENTS

| 772714 | 8/1934 | France | 33/455 |
| 86749 | 12/1920 | Switzerland | 33/174 E |

Primary Examiner—Harry N. Haroian
Attorney, Agent, or Firm—Bernard L. Kleinke

[57] ABSTRACT

An apparatus and method is provided for measuring remotely at a position above ground the angle of the notch in a manhole weir for obtaining information to calibrate the monitoring equipment and includes a cross member having a pair of pivotally attached end members adapted to move into engagement with the weir within the V-shaped notch for assuming the shape thereof.

4 Claims, 8 Drawing Figures

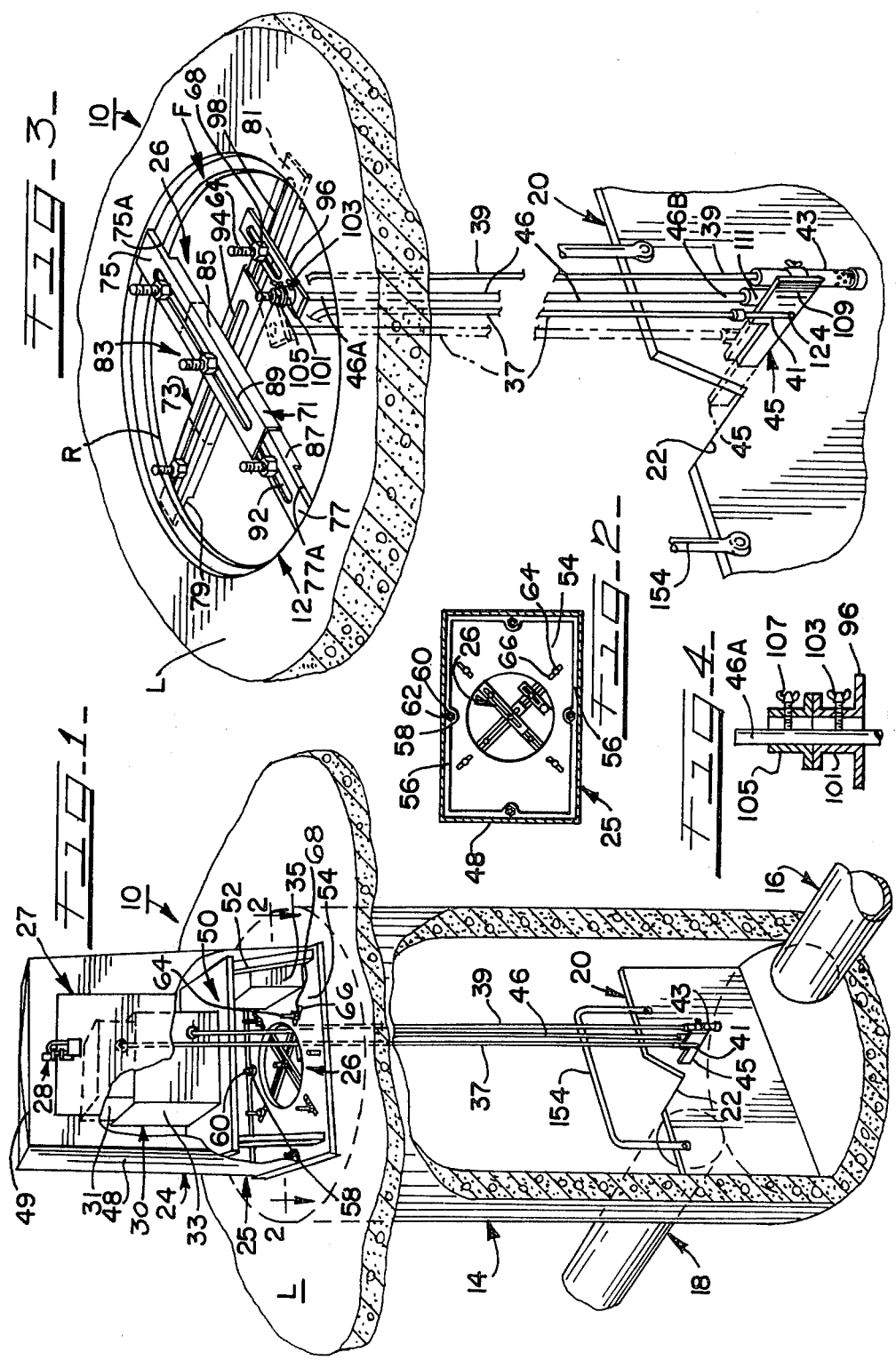

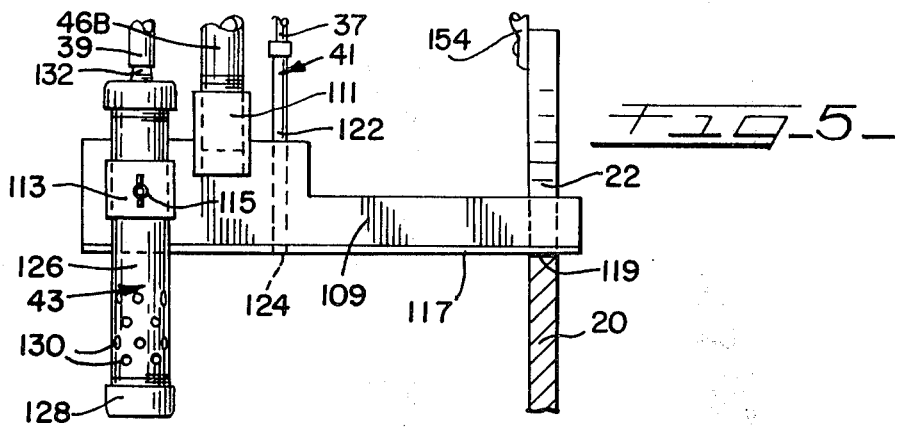
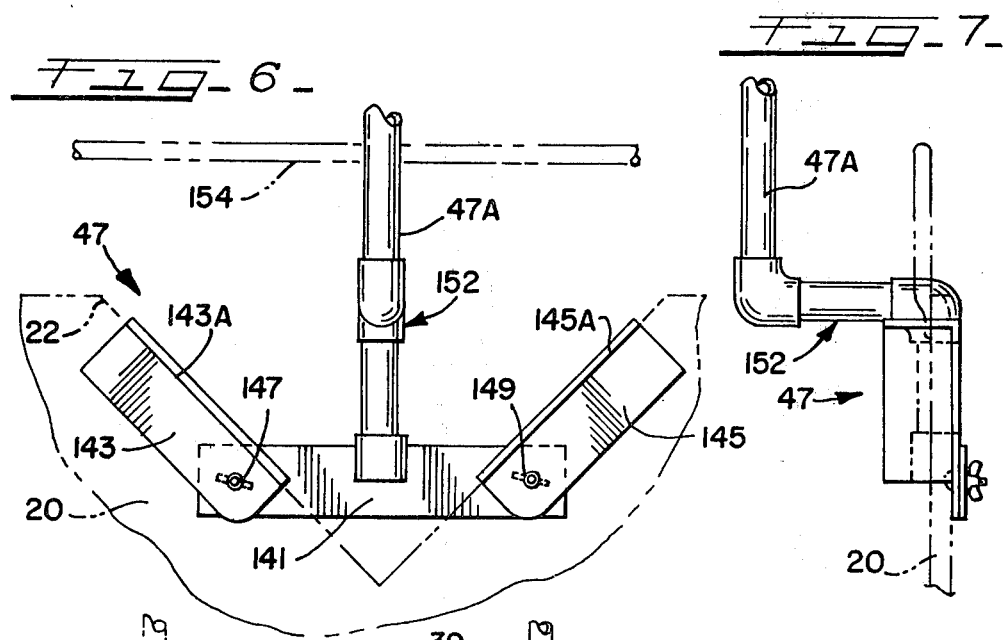
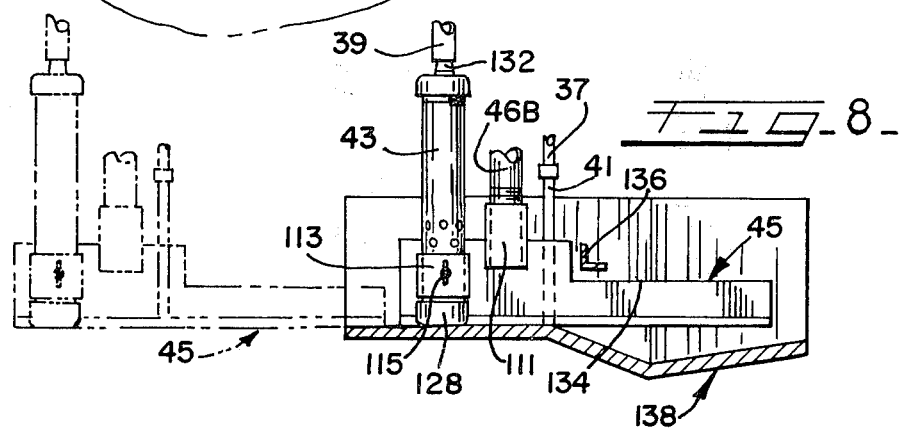

4,413,419

METHOD AND APPARATUS FOR REMOTE MEASURING

This is a division of application Ser. No. 166,372, filed July 7, 1980, now U.S. Pat. No. 4,367,652.

TECHNICAL FIELD

The present invention relates in general to a method and apparatus for monitoring wastewater, and it more particularly relates to a method and apparatus for taking samples of and for measuring flow rates of wastewater flowing in a sewer manhole.

BACKGROUND ART

There have been different techniques for monitoring wastewater flowing in manholes. For example, reference may be made to the following U.S. Pat. Nos. 4,022,059, 4,058,011; 4,095,466; 4,125,020; and 4,145,926. It is apparent from the foregoing patents that it is important periodically to take samples of and to measure flow rates of wastewater flowing in sewer lines via manholes to determine water quality. In this regard, the flow rate is measured, and samples are taken so that they can be analyzed in laboratories to determine whether or not acceptable levels of impurities are contained therein. In this regard, governmental agencies and others have monitored the water quality of wastewater flowing from industrial plants or the like.

In order to gain access to the wastewater flowing in the manhole for monitoring purposes, personnel have entered the manhole via the manhole opening to position flow sampling probes adjacent to a primary measuring device, such as a weir or a flume at the bottom of the manhole thereof. Personnel must first inspect visually the primary measuring device when it is a weir to characterize it. In this regard, the weir includes a V-shaped notch in the upper edge thereof, and the angle thereof must be determined to calibrate the monitoring equipment. The equipment is then mounted in the manhole near the opening thereof. The monitoring operation is employed continuously for certain intervals of time, such as one week, to take water samples and to record flow rates for the wastewater flowing from a given plant. After the time interval, the equipment is removed from the manhole and moved to another manhole for monitoring wastewater from another plant or the like.

While such methods and apparatus have been satisfactory for some applications, it has been a very difficult and dangerous task for requiring personnel to enter the manhole in view of the high flow rates and the very unsanitary and unpleasant conditions found therein. The manhole and its opening is usually confined to a space only sufficiently large to accommodate a person installing the equipment, and thus the person has very little room in which to work. Also, manholes are subject to flash flooding, and thus the installation procedure is treacherous.

Moreover, while the monitoring equipment disposed within the manhole well is inconspicuous since the manhole cover conceals its presence, the unattended automatic equipment can be tampered with in an unauthorized manner by vandals or by those desiring to cause the equipment to provide erroneous information. Thus, it would be highly desirable to monitor wastewater flowing through a manhole without requiring personnel to enter the manhole. Also, it would be highly desirable to enable the wastewater to be monitored in a secure manner by preventing or at least deterring greatly the access to the manitoring equipment by unauthorized persons, once the equipment is installed in place.

DISCLOSURE OF INVENTION

Therefore, the principal object of the present invention is to provide a new and improved method and wastewater monitoring apparatus, which enables the wastewater flowing in a manhole to be monitored without requiring personnel to enter the manhole for installing the monitoring equipment, and which enables the monitoring operation to take place in a secure manner to prevent or at least to deter greatly the access to the unattended automatic monitoring equipment by unauthorized persons.

Briefly, the above and further objects of the present invention are realized by providing a method of monitoring wastewater, which method includes lowering a probe-carrying member into the manhole and moving the member into engagement with a primary measuring device for gauging the depth of the monitoring equipment probes. The member is then moved upstream therefrom and maintained at the same depth for enabling thereafter the wastewater to be monitored.

The apparatus includes a housing having a base portion adapted to be mounted over the manhole entry and adapted to rest on the ground. The base portion has an opening therein for registration with the manhole opening. Monitoring equipment is confined within the housing, which includes a lockable access door for permitting access to the monitoring equipment when the door is opened by authorized persons only. Mounting devices fix the base portion of the housing to the rim of the manhole opening. Tubes depend from the monitoring equipment to probe devices disposed within the manhole for sensing the water flowing therein. Also, there is provided a device for measuring remotely at a position aboveground the angle of the notch in a manhole weir and includes a cross member having a pair of pivotally attached end members adapted to move into engagement with the weir within the V-shaped notch for assuming the shape thereof.

BRIEF DESCRIPTION OF DRAWINGS

The above-mentioned and other objects and features of the invention and the manner of attaining them will become apparent, and the invention itself will be best understood by reference to the following description of an embodiment of the invention taken in conjunction with the accompanying drawings, wherein:

FIG. 1 is a fragmentary pictorial view of the wastewater monitoring apparatus, which is constructed in accordance with the present invention, and which is shown mounted in position for monitoring wastewater flowing in a manhole, portions being broken away for illustration purposes;

FIG. 2 is a cross-sectional plan view of the base portion of the housing of the apparatus of FIG. 1 taken substantially along the line 1—1 thereof;

FIG. 3 is a fragmentary pictorial view of the apparatus of FIG. 1 in the process of performing the method in accordance with the present invention prior to the installation of the housing of FIG. 1;

FIG. 4 is a vertical cross-sectional enlarged view of the locking collars of the apparatus of FIG. 3;

FIG. 5 is a cross sectional fragmentary greatly enlarged elevational view of the foot member of the apparatus of FIG. 1 in the process of engaging a weir according to the method of the present invention;

FIG. 6 is a front elevational fragmentary view of a weir notch angle measuring device, which is constructed in accordance with the present invention;

FIG. 7 is a side elevational fragmentary view of the device of FIG. 6; and

FIG. 8 is a side elevational enlarged view of the foot member of FIG. 1, showing it in the process of engaging a flume according to the method of the present invention.

BEST MODE FOR CARRYING OUT THE INVENTION

Referring now to the drawings, and more particularly to FIG. 1 therein, there is shown a wastewater monitoring apparatus 10, which is constructed in accordance with the present invention and which is used to monitor wastewater via a manhole opening 12 at street level L via a manhole or sewer well 14 which has an inlet 16 and an outlet 18 for permitting the flow of wastewater therethrough. A weir 20 having a V-shaped notch 22 in the upper edge thereof is positioned at the bottom of the well 14 transverse to the flow of fluid therethrough. The weir 20 serves as a primary measuring device, which restricts the flow of the wastewater to a certain channel for a predetermined velocity of flow, thereby enabling the flow rate to be measured more conveniently. Presently, manholes are required by law to be equipped with primary measuring devices, such as the weir 20, so that flow measurements can be made.

Considering now the apparatus 10 in greater detail, the apparatus 10 includes a housing or enclosure 24 which has a base portion 25 mounted over the manhole opening 12 above the ground or street level L. As shown in FIG. 3 of the drawings, a clamping or mounting assembly or device 26 fixes the base portion 25 of the housing 24 to the rim R of the manhole frame F as hereinafter described in greater detail. When moved to its open position, a large lift-out access door 27 exposes a large access opening (not shown) to permit access to the interior of the housing 24, and a hasp and a lock generally indicated at 28 maintains the door 27 in its closed position for security purposes. The housing 24 is constructed in a watertight and weatherproof manner and is composed of sturdy rigid material, such as fiberglass to help prevent tampering therewith.

Automatic wastewater monitoring equipment generally indicated at 30 is in the form of a flow meter 31 and a sampler 33 confined within the housing 24 for monitoring the wastewater flowing through the manhole 14. A battery pack 35 energizes the flow meter 31. A pair of flexible tubes 37 and 39 are connected at their upper ends to the respective flow meter 31 and the sampler 33, and the tubes 37 and 39 extend downwardly into the manhole 14 and are connected respectively to a flow meter probe 41 and a sampler probe 43 mounted on an elongated foot member 45. A long rigid rod 46 is fixed at its lower end 46B (FIG. 5) to the foot member 45 so that the upper end portion 46A (FIG. 3) can be manipulated from above the manhole opening 12 without requiring a person to enter the manhole 14 for guiding the foot member 45 into its proper position relative to the weir 20 in accordance with the present invention, as hereinafter described in greater detail. In this regard, once the foot member 45 is disposed in its proper position as indicated in solid lines in FIG. 3 of the drawings, the probes 41 and 43 cooperate with the respective flow meter 31 and the sampler 33 for monitoring the wastewater flowing within the manhole 14.

Both the flow meter 31 and the sampler 33 may be purchased from Sigmamotor, Inc., located at 14 Elizabeth Street, Middleport, N.Y., 14105. The sampler 43 periodically at predetermined time intervals withdraws by suction sample quantities of the water to be monitored, and the samples are stored therein in sample bottles (not shown). Authorized personnel can gain access to the sample bottles by unlocking the door 27 to remove them from the sampler 43 for testing purposes on a periodic basis, such as once a day.

The flow meter 31 measures the flow rate continuously and records the information on a strip recorder (not shown). The flow rate is measured by forcing air bubbles down the tube 37 and out the probe 41 into the water to be measured. The air is forced at a constant rate through the tube 37 to the measurement point as hereinafter described in greater detail.

As shown in FIGS. 5 and 6 of the drawings, in order to calibrate the flow meter 31 for a given weir, an angle-measuring device 47 having a long rigid handle 47A is used to measure remotely the angle of the notch 22 of the weir 20 from a location above the ground level L as hereinafter described in greater detail.

Considering now the method of monitoring wastewater in accordance with the present invention with particular reference to FIGS. 1 and 3 of the drawings, once the manhole cover (not shown) is removed from the manhole opening 12, the type of primary measuring device within the manhole 14 is determined by visual inspection. In the case of a manhole equipped wth a weir, the type of weir is first characterized by measuring the angle of its notch. By employing the device 47, the angle 22 can be measured remotely above ground level L without the necessity of having personnel enter the manhole 14. The device 47 is held by the handle 47A and lowered downwardly through the manhole opening 12 to engage the notch 22 of the weir 20 for measuring its angle.

By measuring the angle of the notch 22, the type of weir is uniquely identified, and the information concerning the notch angle and the type of weir is used to calibrate the flow meter 31.

The foot member 45 is then lowered through the manhole opening 12 and into the manhole 14 by a person standing on the ground above the opening 12 grasping the rigid rod 46 and guiding it vertically downwardly into the manhole 14 until the foot member 45 is positioned opposite the weir 20. The upper end portion 46A of the rigid rod 46 is held at the manhole rim R and moved within a horizontal plane until the foot member 45 engages the notch 22 as shown in phantom lines of FIG. 3 of the drawings. The foot member 45 is moved into the bottommost portion of the notch 22, and the depth of the foot member at that position is determined or gauged as hereinafter described in greater detail. The upper end portion 46A of the rigid rod is then manipulated at the manhole rim R substantially within a horizontal plane until the foot member 45 is moved rearwardly to a position upstream of the weir 20 as shown in solid lines in FIG. 3 of the drawings, while retaining the foot member 45 at the same depth as just determined. Thereafter, the upper end portion 46A of the rigid rod is fixed to the rim R by means of the clamping device 26, as shown in FIG. 3 of the drawings.

Thereafter, the housing 24 is placed over the manhole opening 20 and fastened to its rim R by means of the mounting device 26 as hereinafter described in greater detail. The upper ends of the tubes 37 and 39 are connected in fluid communication with the respective flow meter 31 and the sampler 33 so that they can commence the monitoring operation. The door 27 is then closed and locked so that the monitoring operation can be left unattended in a secure manner. In this regard, samples can be removed from the sampler 33 periodically by gaining access thereto through the door 27. After monitoring the water flowing through the manhole 14 for a sufficiently long interval of time, such as one week, the apparatus 10 is then disassembled and may be transported conveniently to another location for monitoring purposes. In this regard, the apparatus 10 can be quickly assembled and disassembled, and it is relatively light in weight and not too bulky in nature to facilitate transporting it between locations.

Considering now the housing 24 in greater detail with particular reference to FIG. 1 of the drawings, the housing 24 is generally rectangular in cross section and has vertical walls 48 with a roof 49. A shelf 50 disposed within the housing 24 supports the flow meter 31 and the sampler 33 stacked one above the other, the battery pack 35 being disposed under the shelf 50. A series of legs, such as the leg 52, support the shelf 50 above the base 25.

Considering now the base 25 in greater detail, the base 25 includes a generally rectangular centrally apertured base plate 54, which overlies the manhole opening 12 and rests on the ground L, and which is fixed to the rim R by means of the mounting assembly 26. In order to fix the housing 24 to the mounting assembly 26, the housing 24 has an in-turned base frame or flange 56 integrally connected to the vertical walls 48 of the housing 24 adapted to overlie the marginal edges of the upper surface of the base plate 54 and is fixed thereto as best seen in FIG. 2 of the drawings. The flange 56 includes four intermediate apertured enlarged portions or ears, such as the enlarged portion 58, which receive four upstanding threaded studs or rods, such as the threaded stud 60, fixed at their bottom ends to and extending upwardly from the base plate 54 so that nuts, such as the nut 62 (FIG. 2), can be threaded thereon to secure the base plate 54 to the walls 48 of the housing 24.

In order to fix the base plate and thus the housing to the rim R of the manhole opening 12, as best seen in FIG. 3, a series of four upstanding threaded rods, such as the threaded rod 64 of the mounting assembly 26 are fixed to and extend upwardly through a series of four elongated slots, such as the slot 66 (FIG. 2). A series of four nuts, such at the nut 68, are threaded onto the upper ends of the threaded rods to fasten the base plate 54 to the mounting assembly 26.

Considering now the mounting assembly in greater detail with particular reference to FIG. 3 of the drawings, the mounting assembly 26 generally comprises a pair of arms or brace members 71 and 73, which are arranged in cruciform shape to clamp on to the circular rim R. The brace member 71 is similar to the brace member 73 and is elongated in shape with its opposite end portions 75 and 77 resting on the top portion of the rim R. The lower brace member 73 is elongated in shape and has a pair of opposite end portions 79 and 81 disposed below the rim R. A threaded rod and nut generally indicated at 83 clamp the central portions of the two brace members together in a rigid manner to secure them to the rim R.

Considering now the brace members 71 and 73 in greater detail, the two brace members are similar to one another, and, therefore, only the upper brace member 71 will now be described in greater detail. The brace member 71 is adjustable longitudinally to enable it to accommodate different diameters of manhole rims. In this regard, the member 71 generally comprises an outer channel-shaped rigid arm 85 which receives slidably and telescopically an inner channel-shaped rigid arm 87. The outer rigid arm 85 includes an elongated slot 89 which overlies and is aligned with an elongated slot 92 in the inner rigid arm 87 so that the threaded rod and nuts, such as the rods and nuts 83 can extend therethrough and clamp the two rigid arms of the member 71 to the member 73 which also has similar aligned elongated slots, such as the elongated slot 94. The upstanding threaded rods, such as the rod 64, are fixed within the elongated slots of the brace members near the ends thereof by nuts above (such as the upper nut 95) and nuts below (not shown) the brace members.

In order initially to help guide and position the foot member 45 and subsequently to secure the rod 46 to the mounting assembly 26, a locking arm or link 96 has an elongated slot 98 which is adapted to be slipped over one of the four upstanding threaded rods, such as the rod 64, initially to swing thereabout and subsequently to help fix the arm 96 to one of the braces. The arm 96 is shown in FIG. 3 of the drawings affixed to the lower brace 73. As shown in FIG. 4, an opening in one end of the locking arm receives the upper end 46A of the rigid rod 46, which becomes initially fixed thereto by means of a locking collar 101 secured to the arm 96, and which has a set screw 103 to fix adjustably and releasably the upper end portion 46A of the rigid rod to the locking arm 96.

During the process of manipulating the upper end portion 46A of the rod 46 in a horizontal plane before tightening the nut 68 on the threaded rod 64, the locking arm 96 can swing freely about the rod 64 from the solid line position to the position shown in FIG. 3 in phantom lines, thereby moving the foot member 45 into and out of the notch 22.

When the foot member 45 is moved into the notch 22 as shown in phantom lines in FIG. 3 of the drawings, the probes 41 and 43 are properly positioned at the desired depth of the wastewater flowing in the manhole 14. In this regard, the bottom of the sampler probe 43 is disposed below the foot member 45 so that the probe bottom is positioned below the surface of the water. The bottom of the flow meter probe is disposed flush with the lower edge of the foot member 45 and thus with the bottommost portion of the notch 22.

A locking collar 105 surrounds the upper portion 46A of the rigid rod 46 above the locking collar 101, so that a set screw 107 for the collar 105 may be used to fix the collar 105 to the rod 46 to serve as a "bench mark" when the foot member 45 engages initially the notch 22 as shown in phantom lines in FIG. 3 of the drawings. After fixing the collar 105 to the rod 46, the upper end 46A of the rod 46 may be grasped or moved upwardly relative to the lower collar 101 as the rod 46 is swung backwardly about the threaded stud extending through the elongated slot 98 for the locking arm 96 until the foot member 45 is disposed at a quiescent position upstream from the notch 22 as shown in solid lines in FIG. 3 of the drawings. Thereafter, the rigid rod 46 is then lowered until the upper locking collar 105 engages the lower locking collar 101 as shown in FIGS. 3 and 4 of the drawings. At that position, the foot member 45 is disposed at the same depth as it was when it engaged the notch 22 as shown in phantom lines in FIG. 3 of the drawings.

Once the foot member 45 is disposed in a quiescent position of the wastewater upstream of the notch 22, the probes 41 and 43 are in a position to monitor the wastewater flowing over the weir 20. The set screw 103 for the collar 101 is then tightened to lock the rod 46 to the assembly 26.

Considering now the foot member 45 in greater detail with particular reference to FIGS. 3 and 5 of the drawings, the foot member 45 includes a metal L-shaped rigid member 109 which has a collar 111 fixed thereto by any suitable technique, such as by welding it to the L-shaped member for threadably receiving the lower end 46B of the rigid rod 46. A locking collar 113 if fixed to the L-shaped member 109 by any suitable technique, such as welding, for receiving the probe 43 and retaining it in a position relative to the member 109 by means of a set screw 115. As best seen in FIG. 5, the lower edge 117 is a knife edge for engaging the lowermost portion or crest 119 of the notch 22 to accurately position the probes 41 and 43 relative to the crest 119 of the notch 22.

Considering now in greater detail, the probe 41, with particular reference to FIG. 5 of the drawings, the probe 41 includes a bubble tube 122, which has an opened bottom end disposed flush with the knife edge 117. The bottom end is open to facilitate air bubbles to flow therefrom, and the upper end is connected in fluid communication with the tube 37, which in turn is connected to the flow meter 31 within the housing 24 for forcing air bubbles from the bottom end of the tube 122. Air is forced at a constant rate from the flow meter 31 through the tube 37 and out the bubble tube 122 and into the wastewater to measure its flow rate. The pressure required to maintain a constant bubble rate is proportional to the liquid flow rate at the measurement point at the desired level relative to the crest 119 of the weir notch 22.

Considering now the probe 43 in greater detail, the sampler 43 includes a larger tube 126, which has a capped bottom end 128 and a series of perforations or holes 130 disposed immediately thereabove to permit wastewater to be drawn therein for sampling purposes. A pipe nipple 132 at the upper end of the suction tube 126 connects it to the tube 39 in fluid communication therewith.

Referring now to FIG. 8 of the drawings, the foot member 45 is shown being used in connection with another type of primary measuring device. For this purpose, the L-shaped member 109 includes a cut-out position 134 to enable the foot member 45 to be positioned in a primary measuring device flume 138 under its cross brace 136 for gauging the proper depth for the monitoring probes.

In order to gauge the proper depth relative to the flume 138, the knife edge 117 of the L-shaped 109 is manipulated into position as shown in solid lines in FIG. 8 of the drawings in a similar manner as when it is manipulated into the position within the crest 119 for the weir 20. Thereafter, the foot member 45 is backed out of the flume 138 upstream thereof to a quiescent position in the flow of wastewater as indicated in phantom lines in FIG. 8 of the drawings. At that position, the probes 41 and 43 are disposed in proper position for monitoring the wastewater.

It should be noted that, when the foot member 45 is used in connection with a flume, the tube 126 of the probe 43 is positionally adjusted upwardly until the capped end 128 is disposed flush with the knife edge 117 so that the entire foot member 45 can enter the flume and rest thereon as shown in solid lines in FIG. 8 of the drawings. The locking collar 113 of the set screw 115 secure it in that position. The probe 43 is submerged under water in that measuring position when used with a flume.

Referring now to FIGS. 6 and 7 of the drawings, the angle measuring device 47 will now be considered in greater detail. The device 47 includes an elongated rigid cross arm 141, which is fixed to the long handle 47A extending upwardly therefrom. For illustration purposes, the upper end of the handle 47 is not shown in the drawings. A pair of side arms 143 and 145 are pivotally connected at the respective pivot points 147 and 149 to the opposite ends of the cross arm 141 to assume generally the U-shape as shown in FIG. 6 of the drawings. The arms 143 and 145 include flanges bent at 143A and 145A respectively for engaging the weir 20 at the notch 22.

An L-shaped off-set portion 152 of the long handle 47A at the lower end thereof enables the arms to be slipped under a handle 154 disposed at the upper edge of the weir 20. The handle 154 is normally used to facilitate the installation of the weir 20.

In operation, the device 47 is lowered into the manhole 14 and the arms are slipped under the handle 154 of the weir 20 until the flanges 143A and 145A engage the weir 20 at the notch 22. The arms are then pushed downwardly, and, in so doing, the side arms 143 and 145 pivot about their respective pivot points 147 and 149 to assume the configuration of the notch 22.

Thereafter, the device 47 is raised out of the manhole 14 to measure conveniently the angular relationship between the flanges 143A and 145A, and, therefore, determine the angle of the notch 22 for calibrating the flow meter 31.

I claim:

1. A notch measuring device for measuring the angle of a V-shaped notch in a top edge of a weir positioned in a manhole, handle means extending above the notch comprising:

a cross arm;

an elongated long rigid handle fixed to the cross arm;

a pair of upstanding side arms pivotally attached at their bottom ends to the opposite ends of said cross arm for moving transversely into engagement with the weir at the notch to be measured, said side arms including respective flanges transversely bent relative thereto and extending backwardly therefrom for engaging the top edge portion of the weir defining the notch as said arms move into engagement with the weir to cause said arms to pivot relative to said cross arms to assume the angular relationship of the notch, said handle including an off-set portion adjacent to the cross arm to enable said arms to be slipped under the handle means extending above the notch.

2. A notch measuring device according to claim 1, wherein said handle is of sufficient length to extend downwardly from the entry of the manhole to the notch in the weir, said handle being adapted to be manipulated at the manhole entry.

3. In a method of measuring the angle of a notch in a top edge of a weir positioned at the bottom of a manhole, the weir having handle means extending above the notch, the steps comprising:

providing a notch measuring device having a long rigid handle and having a pair of side arms pivotally attached to the opposite ends of a cross arm fixed to the bottom end of the handle, the handle having an off-set portion adjacent the cross arm, said side arms having respective flanges transversely bent relative thereto and extending backwardly therefrom;

lowering the device into the manhole by using the handle until the lower end thereof is disposed near the notch;

slipping the arms transversely under the handle means at the offset by manipulating the handle means at the upper end thereof until the flanges engage the weir at the notch therein; and pushing the arms downwardly by manipulating the upper end of the handle means to cause the side arms to pivot about their respective connections to the cross arm as the flanges move downwardly along the top edge of the weir at the notch therein to assume the configuration of the notch.

4. In a method according to claim 3, the steps further include raising the device out of the manhole; and thereafter measuring the angular relationship between the flanges to determine the angle of the notch.

* * * * *